United States Patent [19]

Haruki et al.

[11] Patent Number: 4,507,739

[45] Date of Patent: Mar. 26, 1985

[54] SORTER SYSTEM FOR POSTAL MATTER

[75] Inventors: Kazuhito Haruki, Kawasaki; Takeshi Kohno, Yokohama; Yasuo Nagase, Tokyo, all of Japan

[73] Assignee: Tokyo Shibaura Denki Kabushiki Kaisha, Kawasaki, Japan

[21] Appl. No.: 378,412

[22] Filed: May 14, 1982

[30] Foreign Application Priority Data

May 19, 1981 [JP] Japan .................................. 56-75162

[51] Int. Cl.³ .............................................. G06F 15/20

[52] U.S. Cl. .................................... 364/478; 364/200; 209/584; 209/900

[58] Field of Search ................ 206/215; 209/551, 584, 209/900; 235/491; 364/466, 467, 478, 479, 406, 478, 479, 200, 900

[56] References Cited

U.S. PATENT DOCUMENTS

| | | | |
|---|---|---|---|
| 3,573,748 | 4/1971 | Holme | 364/200 |
| 3,757,939 | 9/1973 | Henig | 209/584 |
| 3,782,541 | 1/1974 | Wood | 209/900 X |
| 3,837,484 | 9/1974 | Ruckebier et al. | 364/478 X |
| 3,983,366 | 9/1976 | Gunn | 235/491 X |
| 4,117,975 | 10/1978 | Gunn | 209/584 X |
| 4,167,476 | 9/1979 | Jackson | 209/551 X |
| 4,201,339 | 5/1980 | Gunn | 235/491 X |
| 4,264,808 | 4/1981 | Owens et al. | 364/406 X |
| 4,358,016 | 11/1982 | Richardson et al. | 364/478 X |
| 4,388,994 | 6/1983 | Suda et al. | 209/900 X |

OTHER PUBLICATIONS

IBM Technical Disclosure Bulletin, vol. 13, No. 5, Oct. 1970, pp. 1345–1348; R. H. Hillsley et al., "Recycling Document Sorting and Sort Algorithm."

*Primary Examiner*—Gary Chin
*Assistant Examiner*—Edward R. Cosimano
*Attorney, Agent, or Firm*—Finnegan, Henderson, Farabow, Garrett & Dunner

[57] ABSTRACT

A letter sorting machine (LSM) system of the invention has a plurality of LSMs, each having a feeder, a reader, horizontal convey paths, bins with a push-out mechanism, an elevator mechanism, a separating mechanism for separating the postal matter from the trays, a destination label printer, and a bundling machine. These LSMs are connected to a centralized system controller. The centralized system controller has a computer and a magnetic disk for storing a schedule for determining the mode of each LSM.

The computer reads out the schedule table from the magnetic disk and controls the modes of the LSM for performing the primary or secondary sortation according to the kinds and amount of the postal matter to be sorted.

3 Claims, 7 Drawing Figures

| HOURS | LINE NO. | OPERATION | MODE | CLASSIFICATION |
|---|---|---|---|---|
| 10:05 | 1 | START | PRIMARY | FROM THE OTHER POST STATION |
| 10:20 | 2 | START | SECONDARY A | ——— |
| ⋮ | ⋮ | ⋮ | ⋮ | ⋮ |
| | | | | |

SORTER SYSTEM FOR POSTAL MATTER

BACKGROUND OF THE INVENTION

The present invention relates to a sorting machine system for postal matter with a postal code (corresponding to a zip code).

Various automatic processing machines for postal matter have been recently developed along with simplification of works in post offices. One of the machines is a letter sorting machine (LSM) with an automatic postal code reader. In Japan, the postal code is expressed by an upper set of three digits and a lower set of two supplementary digits separated by a hyphen therefrom. In each post office, the postal matter are classified for about 1000 destination areas according to the upper three digits. Therefore, in order to classify or sort postal matter, a great number of bins corresponding to the destination areas must be prepared on the shelf part of the LSM. However, the bins can hardly be mounted in the LSM due to the size of the LSM and the installation space. Conventionally, a sorting shelf having about 70 boxes thereon has been used and manual sortation has been performed. Each postal matter is primarily sorted into the bins of the shelf corresponding to destination areas represented by the upper three digits of the postal code and corresponding to 13 groups of adjacent areas.

A technique for applying the primary and secondary sortations to LSMs has been considered. However, if LSMs are separately arranged for primary sortation and secondary sortations of each group, the efficiency of operating LSMs is lowered, resulting in high cost.

SUMMARY OF THE INVENTION

It is, therefore, an object of the present invention to provide a letter sorting machine (LSM), which comprises a plurality of LSMs with automatic postal code reader, with improved efficiency by effectively performing primary and secondary sortations of the postal matter.

According to the LSM system of the present invention, a plurality of LSMs can be selectively used for primary sortation or secondary sortation in accordance with changes in the number of postal matter with respect to time and the deadlines of daily delivery of the postal matter, resulting in high operating efficiency.

In order to achieve the above object of the present invention, there is provided a letter sorting machine (LSM), comprising:

(A) a plurality of LSMs having a function to selectively sort, in accordance with postal codes, postal matter primarily and secondarily, each of said plurality of LSMs comprising

- (a) means for reading destination data corresponding to a postal code on postal matter,
- (b) a plurality of bins which are vertically disposed in a plurality of stages, on which the postal matter are stacked, and each of which has a pickup mechanism,
- (c) means for sorting and stacking the postal matter in said plurality of bins on the basis of the destination data from said reading means,
- (d) a transfer mechanism which sequentially opposes said plurality of bins and which receives stacked postal matter picked up from said plurality of bins,

- (e) a destination label printer for printing a destination label for the stacked postal matter transferred by said transfer mechanism, and
- (f) a bundling unit for bundling the stacked postal matter on which the destination label is printed; and (B) means for determining the number of said LSMs to be operated and for selecting said LSMs for primary sortation and secondary sortation according to an amount of postal matter to be processed.

BRIEF DESCRIPTION OF THE DRAWINGS

Other objects and features of the present invention will be apparent from the following description taken in connection with the accompanying drawings in which.

DETAILED DESCRIPTION OF THE PREFERRED EMBODIMENT

Figure 1:
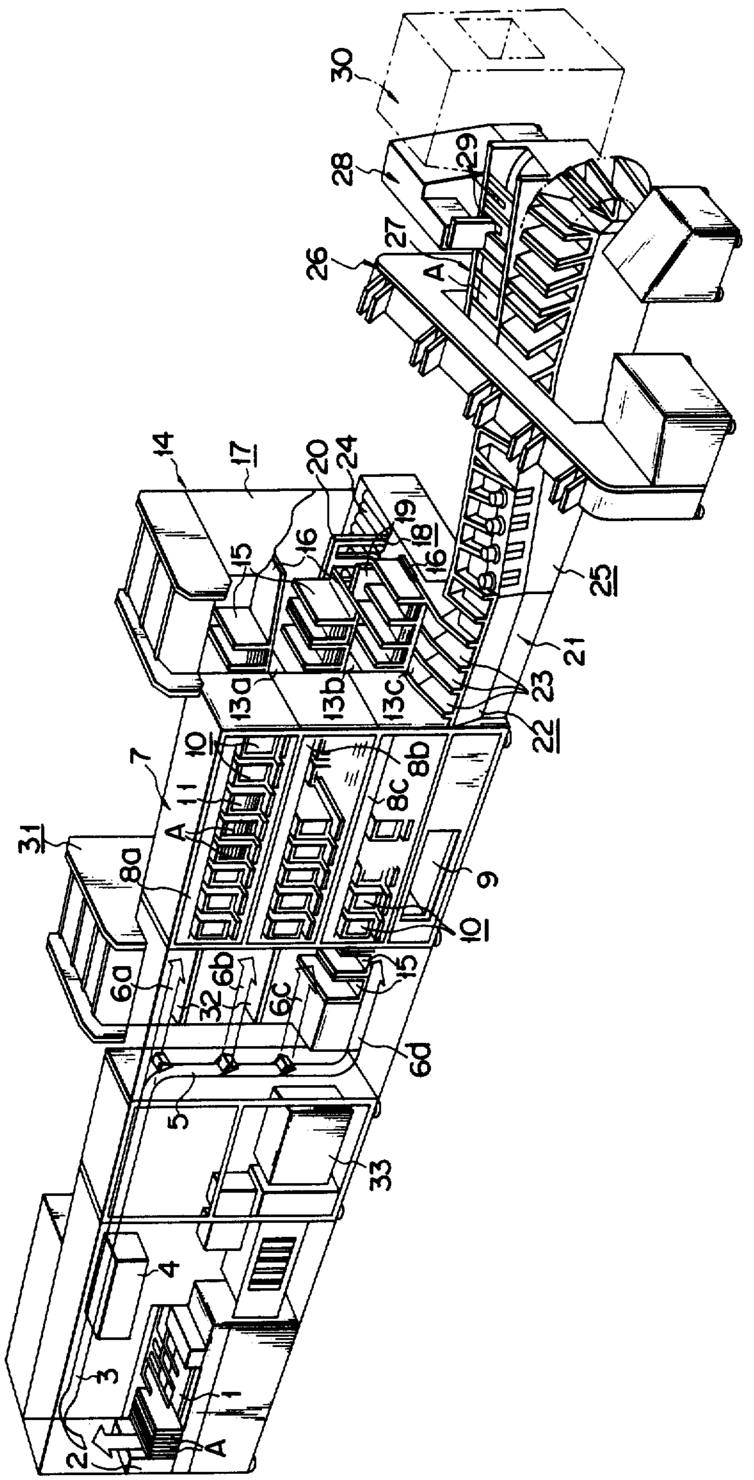
FIG. 1 is a schematic perspective view of an LSM as part of a LSM system of the present invention.

Referring to FIG. 1, a group of postal matter A such as post cards and letters are set upright in a feeder 1. Each piece of postal matter A is sequentially picked up by a pickup 2. The postal matter A are then read by a reader 4 which are arranged on a conveyor path 3. Thus, postal codes on the postal matter A are read, while being transferred along the conveyor path 3.

The postal matter A is then selectively supplied to sortation paths 6*a*, 6*b*, 6*c* and 6*d* which are vertically arranged in a gate mechanism 5 in accordance with the results obtained by the reader 4. The postal matter A is then supplied to horizontal conveyor paths 8*a*, 8*b* and 8*c* of a sorter 7 having an automatic pickup function and a discharge bin 9.

A plurality of bins 10 are disposed on the side of the rear surfaces of the horizontal conveyor paths 8*a*, 8*b* and 8*c* of the sorter 7. Each of the postal matter A is fed to the horizontal conveyor path 8*a*, 8*b* or 8*c* and is stacked in a predetermined one of the bins 10 in accordance with the results obtained by the reader 4.

When a proper amount of postal matter A is stacked in one of the bins 10, or when a compulsory push-out switch (not shown) is depressed, a pickup mechanism, for example, a push-out mechanism (not shown) of the stacker 10 is operated and pushes out the postal matter A within the bin 10 against the rear surface of the sorter 7.

A tray circulating unit 14 with horizontal paths 13*a*, 13*b* and 13*c* for trays arranged vertically in three stages in correspondence with the bins 10 is disposed on the rear surface of the sorter 7. The postal matter A pushed out from the respective bins 10 are placed on trays 15 which are sequentially intermittently transferred on the horizontal convey paths 13*a*, 13*b* and 13*c*.

An elevator mechanism 17 is arranged at the terminal end side of the paths 13*a*, 13*b* and 13*c*. The elevator mechanism 17 enables tray tables 15 to be transferred from the terminal side to the front end of paths 13*a*, 13*b* and 13*c*. The elevator mechanism 17 receives the trays 15 with the postal matter A stacked thereon (may be empty) delivered from the horizontal path 13*a*, 13*b* and 13*c*. The elevator mechanism 17 then carries the trays 15 to the separator of the separating mechanism 18 for separating the postal matter A from the trays. Push-out plates 19 for pushing out the postal matter A and pull-in plate 20 for pulling in the trays 15 reciprocate at the separating mechanism 18. During the forward movement, the push-out plates 19 push out the postal matter A on the trays 15 towards the front to place them on facers 23 of a facer unit 22 at the initial end of a conveyor line 21. During the backward movement, the pull-in plates 20 pull the empty trays 15 backward to place them at the initial end of a tray return path 24 of the tray circulating unit 14.

The postal matter A supplied to the line 21 are transferred by a facer unit 25 constituting the line 21. During the conveying operation, the back side of the postal matter in the direction of their movement and one end thereof in the direction perpendicular thereto are faced. The faced postal matter A are then transferred on another conveyor line 27 by a transfer mechanism 26 extending perpendicularly to the line 21. A destination label 29 is attached on the uppermost one of the postal matter A by a destination label printer 28 facing the line 27. The postal matter A with the destination card attached thereon is then supplied for bundling to a bundling machine 30 arranged at the terminal end of the line 27.

Meanwhile, trays 15, which are placed on the tray return path 24 by the separating mechanism 18 are transferred to the side of an elevator mechanism 31 at the initial ends of the horizontal convey paths 8*a*, 8*b* and 8*c*. The trays 15 are then placed on tray tables 32 of the elevator mechanism 31 by a tray transfer mechanism (not shown) facing the terminal end of the tray return path 24. The elevator mechanism 31 intermittently circulates the tray tables 32 so that the tray tables 32 may sequentially face the initial ends of the horizontal convey paths 13*a*, 13*b* and 13*c* in the order named. The trays 15 facing the initial ends of the horizontal convey paths 13*a*, 13*b* and 13*c* are pushed by a push mechanism (not shown) and the trays 15 on the horizontal convey paths 13*a*, 13*b* and 13*c* are conveyed by one pitch. The tray 15 at the terminal end is placed on the tray table 16 of the elevator mechanism 17. The overall system is controlled by a control section 33. The LSM system of the present invention incorporates a plurality (5 in the embodiment shown in FIG. 2) of LSMs as described above.

The configuration of a LSM system according to an embodiment of the present invention will now be described with reference to FIGS. 2 and 3.

The postal matter collected from mailboxes are placed in cases (not shown) which are then aligned on a case conveyor 51. In operation, the cases are conveyed to a case dumper 53. The postal matter is dumped out of the cases by the case dumper 53 and are automatically conveyed to a rough culling table 55 shown in FIG. 2. The operator removes the postal matter which are not suitable for automatic sortation, such as oversized postal matter and rolls. The removed items are conveyed to a manual cancelling table (not shown) by a belt conveyor 57. The remaining postal matter is conveyed to one of hoppers of culler/facer/cancellers (CFCs) 61 by a pan conveyor 59. Each CFC 61 automatically rejects items which are not suitable for automatic sortation such as too thin or too thick items, stiff items, or items containing hard objects. The rejected items are transferred to the manual cancelling table mentioned above. On the other hand, the postal matter which may be subjected to automatic sortation are faced and stamped and regular postal matter thereof are directly transferred to letter sorting machines (LSMs) 63, while special postal matter are stacked on local stackers of the CFCs 61.

The regular postal matter which is faced and stamped is automatically supplied one by one to the LSM 63 through a transport coupler 67 which comprises an arch transport and a coupler 66. At the LSM 63, the optical character reader (OCR) detects the postal codes on the postal matter which are handwritten or printed. Then the postal matter is stacked on bins 10 having automatic push-out mechanisms. Those which require secondary sortation are stacked on one of six terminal stackers 69.

The postal matter which need not be processed by the CFC are placed in cases on another case conveyor 52 which is different from the case conveyor 51 for the postal matter collected from other post offices. The postal matter in this category includes those which have been accepted at the post offices and are faced or those which have been bundled at the other post offices and have been transported. In operation, these cases are lowered to positions near the LSM feeder, and the postal matter are fed to the LSM feeder. The OCR detects the postal codes on the postal matter which are handwritten or printed. Then, the postal matter is stacked on the bins 10 with automatic push-out mechanisms which are one of the sortation terminals or are stacked on one of the six terminal stackers 69 for secondary sortation.

The postal matter which have been completely sorted by primary sortation are transferred to the bins 10 with the automatic push-out mechanisms. When substantial amounts of the postal matter are stacked on the bins 10, the postal matter is horizontally pushed to the back and are placed on the trays 15 which are conveyed sequentially on the horizontal paths 13*a*, 13*b* and 13*c*. The postal matter is then transferred to a label printer 28 through the horizontal convey paths 13*a*, 13*b* and 13*c*, the elevator mechanism 17, and the separating mechanism 18.

The postal matter with labels printed thereon from the label printer 28 is supplied to bundling machines 30 and is bundled crosswise with plastic tape. The bundles of postal matter are output to a bundle conveyor 75.

Figure 2:
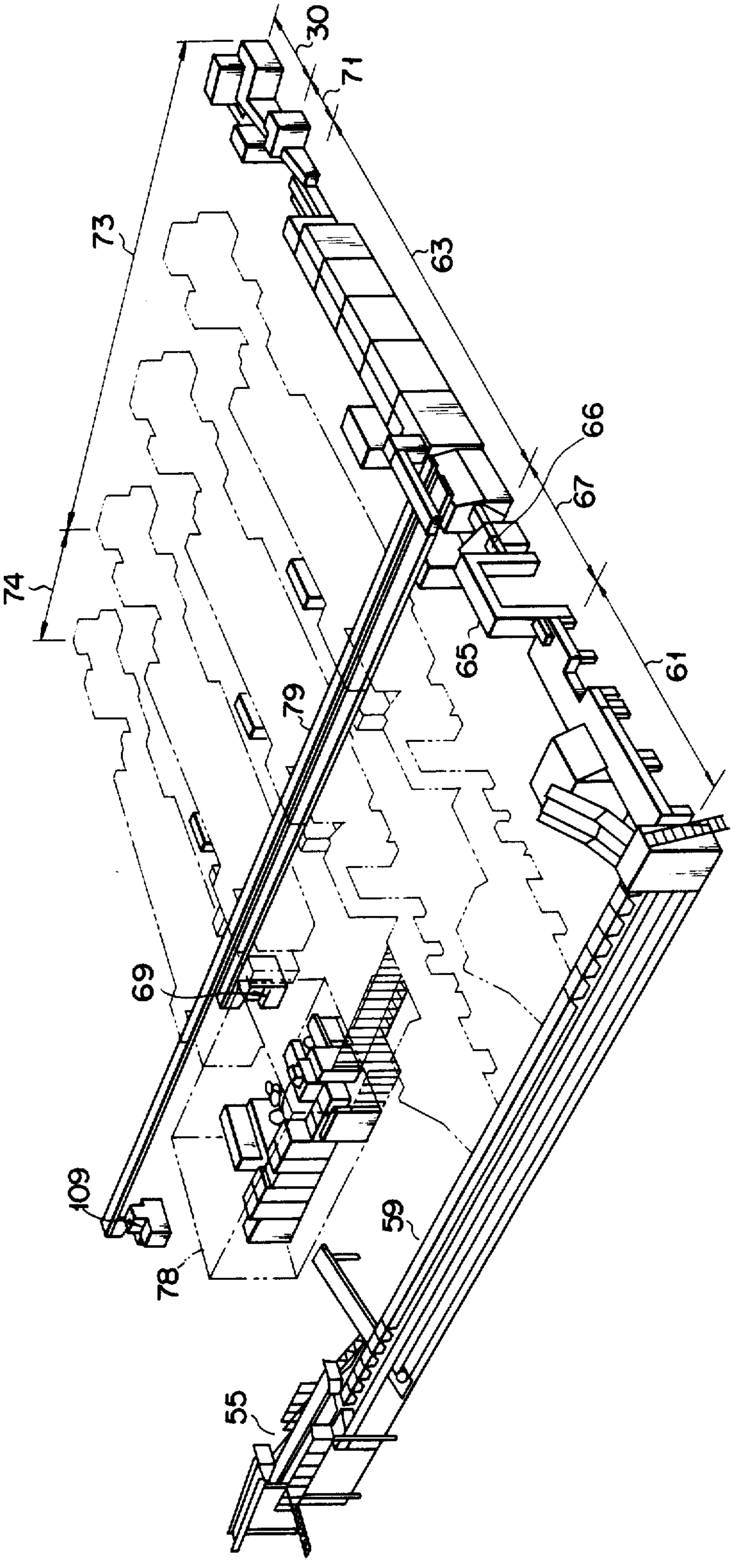
FIG. 2 is a schematic perspective view of the overall arrangement of the LSM system which has a plurality of LSMs shown in FIG. 1.
Figure 3:
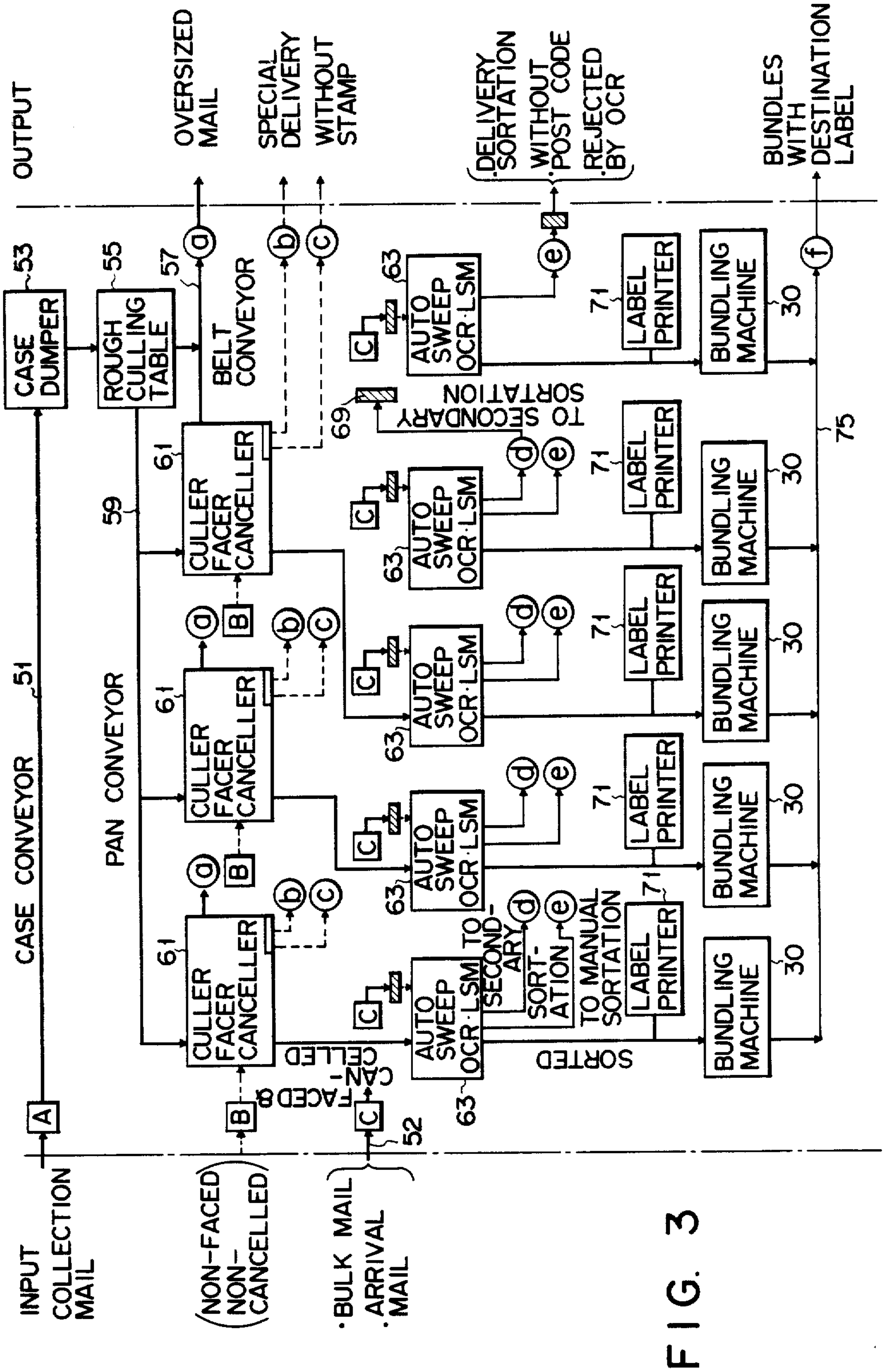
FIG. 3 is a flow chart for explaining primary sortation and secondary sortation of the postal matter in the LSM system shown in FIG. 2.

As shown in FIGS. 2 and 3, this embodiment has five sorter lines. The first through third sorter lines have CFCs and are capable of sorting the postal matter which has been collected from the mailboxes, accepted at the post office and postal matter transported from other post offices. The fourth sorter line does not have a CFC and is capable of sorting only the postal matter which has been accepted at the postal offices and which has been transported from other post offices. The fifth sorter line does not have a CFC and is not connected to the secondary sortation terminal stacker. Therefore, the fifth sorter line is capable of only sorting the postal matter which has been transported from other post offices (the destination areas of this postal matter being specified in the primary sortation so as not to subject them to the secondary sortation).

Although the secondary sortation may be performed at any of the sorter lines, the fifth sorter line is mainly used for the secondary sortation. This is because the fifth sorter line is close to the terminal stackers 69 as shown in FIG. 3 and it is capable of only sorting the postal matter subjected to the primary sortation at other post offices.

The postal matter which must be subjected to the secondary sortation are roughly classified according to six destination areas based on the readout results of the OCR and are transferred to the terminal stackers 69 near the LSMs 63 through overhead transport means 79 so as to be subjected to the secondary sortation.

At the LSM 63 whioh has been instructed to perform the secondary sortation, the operator selects one of the six destination modes (A to F) and feeds the postal matter to the LSM. The OCR of the LSM reads the postal codes one by one. The postal matter are sorted into the bins according to the readout results of the OCR and the code-bin assignment table of the selected destination mode. The sorted postal matter is automatically transferred along horizontal paths 13*a*, 13*b* and 13*c* in tray 15 and onto conveyor line 21 vertically repositioned by elevator mechanism 17. Then, line 21 conveys the postal matter to bundling machine 30 through label printer 28.

The overall system is monitored and controlled by a centralized system controller 77.

Figure 4:
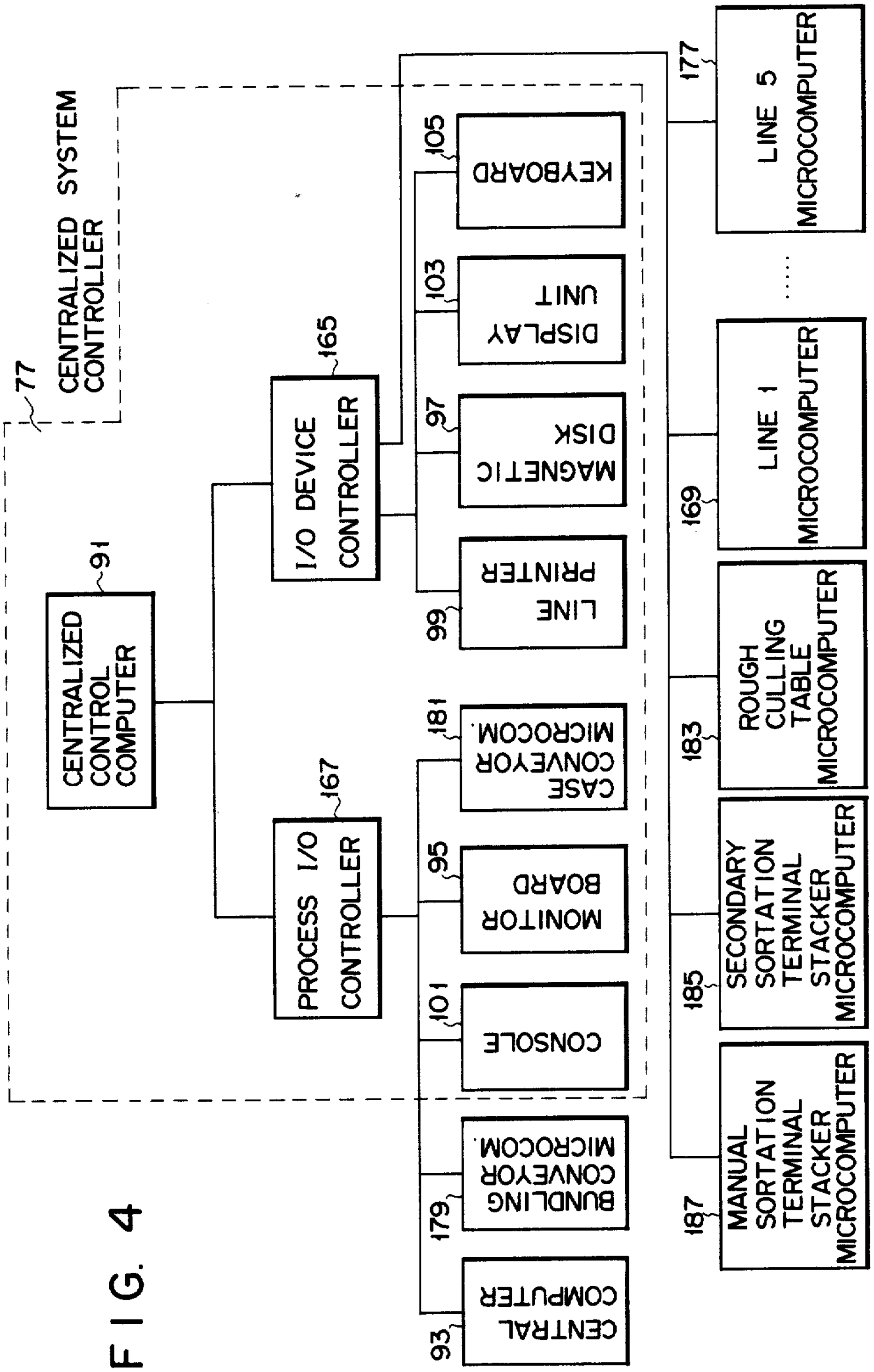
FIG. 4 is a block diagram of the LSM system of the present invention displaying a centralized system controller and microcomputers connected thereto.

FIG. 4 is a block diagram of a centralized system controller of the system according to the present invention. A centralized control computer 91 is connected through a process I/O controller 167 to a central computer 93, a bundling conveyor microcomputer 179, a console 101 for instructing the operation of the system, a monitor board 95 for monitoring the ON/OFF state of the system or the operation status of each unit, and a case conveyor microcomputer 181. The centralized control computer 91 is also connected through an I/O device controller 165 to a line printer 99 for printing daily, weekly and monthly reports, a magnetic disk 97 for storing schedule tables, code-bin assignment tables, statistics, control program and so on, a display unit 103 for displaying the amounts of the sorted and rejected postal matters, and a keyboard 105 for inputting data for changing the code-bin assignment tables or schedule tables.

As described above, the centralized control computer 91 is connected to the central computer 93 through the process I/O controller 167. When a command signal for retrieval of data on the amount of sorted postal matter has been received from the central computer 93, the centralized control computer 91 acknowledges the central computer 93 regarding the amount of sorted postal matter and the operation status.

The centralized control computer 91 is further connected through the I/O device controller 165 to line 1 to line 5 of microcomputers 169, 171, 173, 175 and 177; a rough culling table microcomputer 183; a secondary sortation terminal stacker microcomputer 185; and a manual sortation terminal stacker microcomputer 187.

The centralized control computer 91 supplies through the I/O device controller 165 to the line 1 to line 5 of microcomputers 169, 171, 173, 175 and 177 the operation guide data such as operation start or operation stop signals or code-bin assignment table data. On the other hand, the line 1 to line 5 of microcomputers 169, 171, 173, 175 and 177 supply through the I/O device controller 165 to the centralized control computer 91 the amounts of the sorted postal matter in each box, the number of bundles, the amount of postal matter for each postal code, and the operation status. The rough culling table microcomputer 185 supplies the operation status data to the centralized control computer 91 through the I/O device controller 165. On the other hand, the centralized control computer 91 supplies the operation guide data to the rough culling table microcomputer 183 through the I/O device controller 165.

The secondary sortation terminal stacker microcomputer 185 supplies the operation status data and the secondary sortation data to the centralized control computer 91 through the I/O device controller 165. On the other hand, the centralized control computer 91 supplies the operation guide data to the secondary sortation terminal stacker microcomputer 185 through the I/O device controller 165.

The manual sortation terminal stacker microcomputer 187 supplies the operation status data to the centralized control computer 91 through the I/O device 165, while the centralized control computer 91 supplies the operation guide data to the manual sortation terminal stacker microcomputer 187 through the I/O device controller 165.

The case conveyor microcomputer 181 supplies the operation status data to the centralized control computer 91 through the process I/O controller 167.

The case conveyor microcomputer 181 supplies the operation status data to the centralized control computer 91 through the process I/O controller 167.

Figures 5, 6:
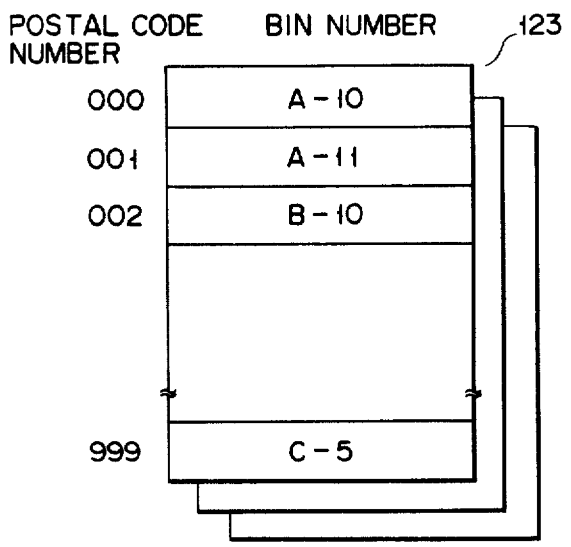
FIG. 5 shows an example of a schedule table which is stored in a magnetic disk of the centralized system controller shown in FIG. 4 and which indicates control operation of each line.
FIG. 6 shows an example of a code-bin assignment table for specifying pocket numbers according to postal code numbers of the postal matter.

FIG. 5 shows an example of a schedule table 121 stored in the magnetic disk 97. According to this schedule table 121, the sorter line 1 (line 1 of the five lines) is started in the primary sortation mode for sorting the postal matter from the other post station at 10:05. At 10:20, the sorter 2 is started in the mode A of the secondary sortation.

FIG. 6 shows an example of a code-bin assignment table 123 stored in the magnetic disk 97. For example, the postal matter with the postal code "000" are stacked on the bin 10 of the stage A (bin number A-10). The postal matter of the postal code "001" are stacked on the bin 10 of the stage A (bin number A-11). The postal matter with the postal code "003" are stacked on the bin 10 of the stage B (bin number B-10). The postal matter with the postal code "999" are stacked on the stacker 10 of the stage C (bin number C-5). In this manner, the postal matter is stacked on the predetermined stackers. Several code-bin assignment tables as that described above are prepared for the primary sortation mode, and the secondary sortation modes A to F. Although these schedule tables and code-bin assignment tables are set before the operation of the system, they may be modified by inputting updated data from the keyboard 105.

Figure 7:
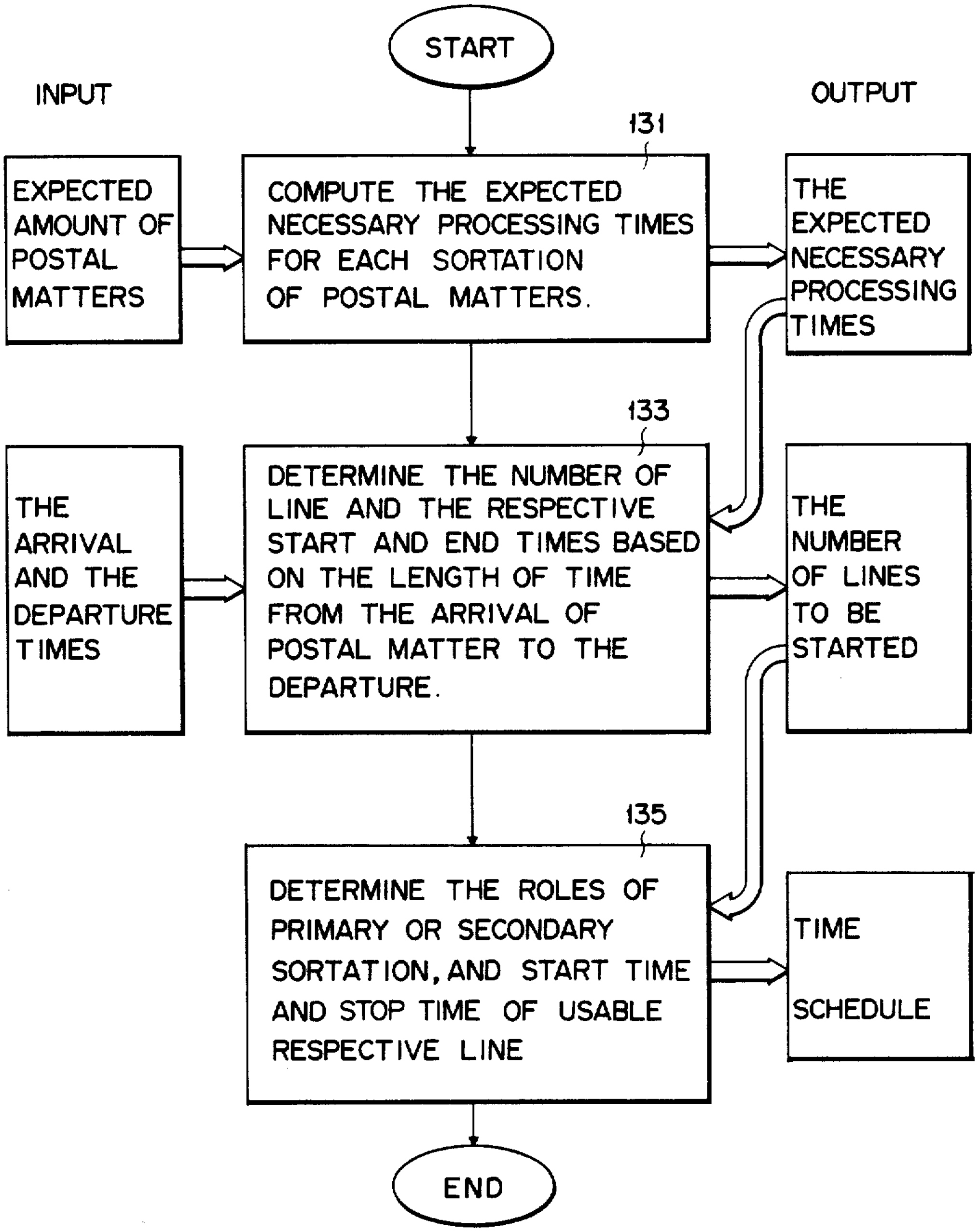
FIG. 7 is a flow chart for explaining how the operation schedule of the LSM system of the present invention is made.

FIG. 7 is a flowchart for explaining the control operation of the system according to the present invention. Referring to FIG. 7, in step 131, the amounts of the postal matter are statistically estimated for those in the primary sortation mode which are collected from the mailboxes, those which have been accepted at the post offices, and those which have been transferred from the other post offices, and those which are sorted in the secondary sortation modes A to F. From the estimated amounts of the postal matter, a prospective time for processing the postal matter is computed. In step 133, the number of lines and the starting time of each line are determined through the computation of the arrival times of the postal matter and the departure times thereof. In step 135, modes of the respective lines (primary sortation, secondary sortation, stop modes) and the start and stop times are determined. The operations in steps 131 to 135 are preparatory steps and may be performed before the initialization of the system.

When the actual amount of the postal matter exceeds the estimated amount or when an accident happens, steps 131 and thereafter are repeated for readjustment.

The centralized control computer 91 reads out the schedule table from the magnetic disk 97 and displays it at the display unit 103. If the current times reaches an execution time (start or stop time) according to the schedule table, this is notified to the operator by lighting the lamp on the console 101 and the buzzing sound.

The operation status of the CFCs 61, the LSMs 63, the manual sortation terminal stackers, and the secondary sortation terminal stackers are supplied to the centralized control computer 91 through the respective microcomputers controlling these units and through the I/O device controller 165. The centralized control computer 91 displays the received data at the monitor board 95 through the process I/O controller 167. Thus, the operator can determine the instructions to be supplied to each unit while observing the schedule table displayed at the display unit 103 and the operation status displayed at the monitor board 95. When a button on the monitor board 95 corresponding to such an instruction is depressed, the instruction is supplied to the centralized control computer 91 through the process I/O controller which reads out the instruction and supplies the corresponding instruction signal to the corresponding unit through the I/O device controller.

Although five lines are used in this embodiment, the present invention is not limited to this.

While the invention has been particularly shown and described with reference to a preferred embodiment thereof, it will be understood by those skilled in the art that various changes in form and details may be made therein without departing from the spirit and scope of the invention.

What we claim is:

1. A letter sorting machine (LSM) system, comprising:

(A) a plurality of LSMs having a function to selectively sort postal matter primarily and secondarily in accordance with postal codes, each of said LSMs including:

means for reading destination data on postal matter, a plurality of bins vertically disposed in a plurality of stages, said postal matter being stacked thereon, a pickup mechanism for each bin, means for sorting and stacking the postal matter in said plurality of bins on the basis of the destination data from said reading means, a transfer mechanism which cooperates with each of said bins for transferring stacked postal matter from said plurality of bins, a label printer for printing a destination label and applying said label on said stacked postal matter transferred by said transfer mechanism, and a bundling unit for bundling the labelled postal matter by destination as defined by the attached label;

(B) schedule table means for determining a primary sortation mode and a secondary sortation mode to sort said postal matter by postal code;

(C) computer means connected to said plurality of LSMs for determining, in accordance with said schedule table means, the number of said LSMs to be operated and the particular LSMs for said primary sortation and said secondary sortation modes depending upon the amount of postal matter to be sorted.

2. A system according to claim 1, wherein said schedule table means further includes data for identification of said bin corresponding to said destination data and stacking said postal matter thereon.

3. A system according to claim 1, further comprising:

a magnetic disk connected to said computer means for storing a schedule table to determine the primary and secondary sortation modes of said plurality of LSMs;

a console connected to said computer means for directing the operation of said plurality of LSMs;

display means connected to said computer means for displaying the amount of sorted postal matter and contents of said schedule table means;

keyboard means connected to said computer means for inputting instruction data to change said schedule table; and printing means connected to said computer means for printing statistics related to said sorted postal matter.

* * * * *